United States Patent [19]

Bergman et al.

[11] 4,160,372
[45] Jul. 10, 1979

[54] TRANSFER PRESS HAVING QUICK CHANGE DIE SETS

[75] Inventors: Roland J. Bergman; Richard J. Meyer; Richard F. Fortman, all of Minster, Ohio

[73] Assignee: The Minster Machine Company, Minster, Ohio

[21] Appl. No.: 855,313

[22] Filed: Nov. 28, 1977

[51] Int. Cl.² .................................................. B21J 13/02
[52] U.S. Cl. ........................................ 72/404; 72/421; 72/462; 83/698
[58] Field of Search .................. 72/462, 404, 405, 421, 72/472; 83/13, 698

[56] References Cited

U.S. PATENT DOCUMENTS

| | | | |
|---|---|---|---|
| 3,079,817 | 3/1963 | Sanford | 72/405 |
| 3,104,574 | 9/1963 | Andersen | 83/698 |
| 3,111,895 | 11/1963 | Kraft | 83/698 |
| 3,327,575 | 6/1967 | Duffee | 83/698 |
| 3,422,657 | 1/1969 | Grombka | 72/405 |
| 3,435,655 | 4/1969 | Akikazu | 72/462 |
| 3,881,343 | 5/1975 | Ducate | 72/462 |
| 3,995,470 | 12/1976 | Kamelander | 72/405 |

Primary Examiner—Lowell A. Larson
Assistant Examiner—Gene P. Crosby

Attorney, Agent, or Firm—Albert L. Jeffers; John F. Hoffman

[57] ABSTRACT

A transfer press having a plurality of generally linearly spaced die stations, a transfer mechanism for successively advancing blanks or partially stamped parts from one station to the next each cycle of the press and quick change upper and lower die plates mounted in fixtures attached to the press slide and bed or bolster, respectively. Each of the die sets includes a plurality of die fixtures having extendible and retractable clamps which open to permit a die plate to be slid therein and approximately located by means of locating ears on the die plate which contact the forward surface of the respective fixture or by contacting locating blocks at the rear of the fixture. When the clamps are retracted, the die plates are pulled downwardly and are accurately located by means of a plurality of locating pins which engage corresponding apertures in the plates. The clamps lock the plates in their final operative positions for the successive stamping operations. In order to minimize the distance between adjacent fixtures, which is of the utmost importance if the advantages of a transfer system are to be realized, a single clamp mechanism engages the facing edges of each adjacent pair of fixtures.

25 Claims, 12 Drawing Figures

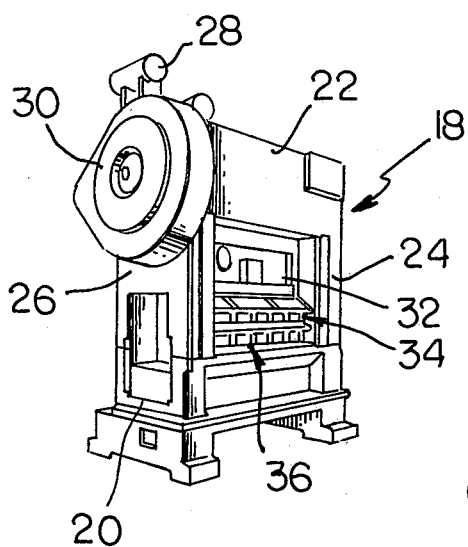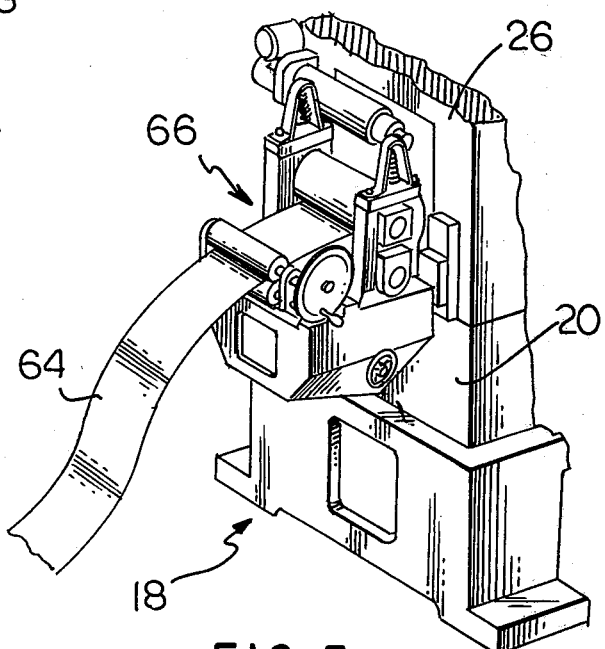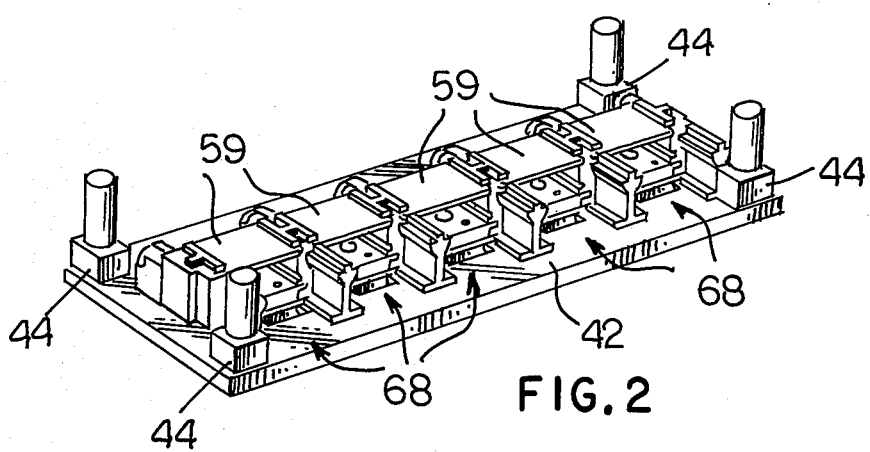

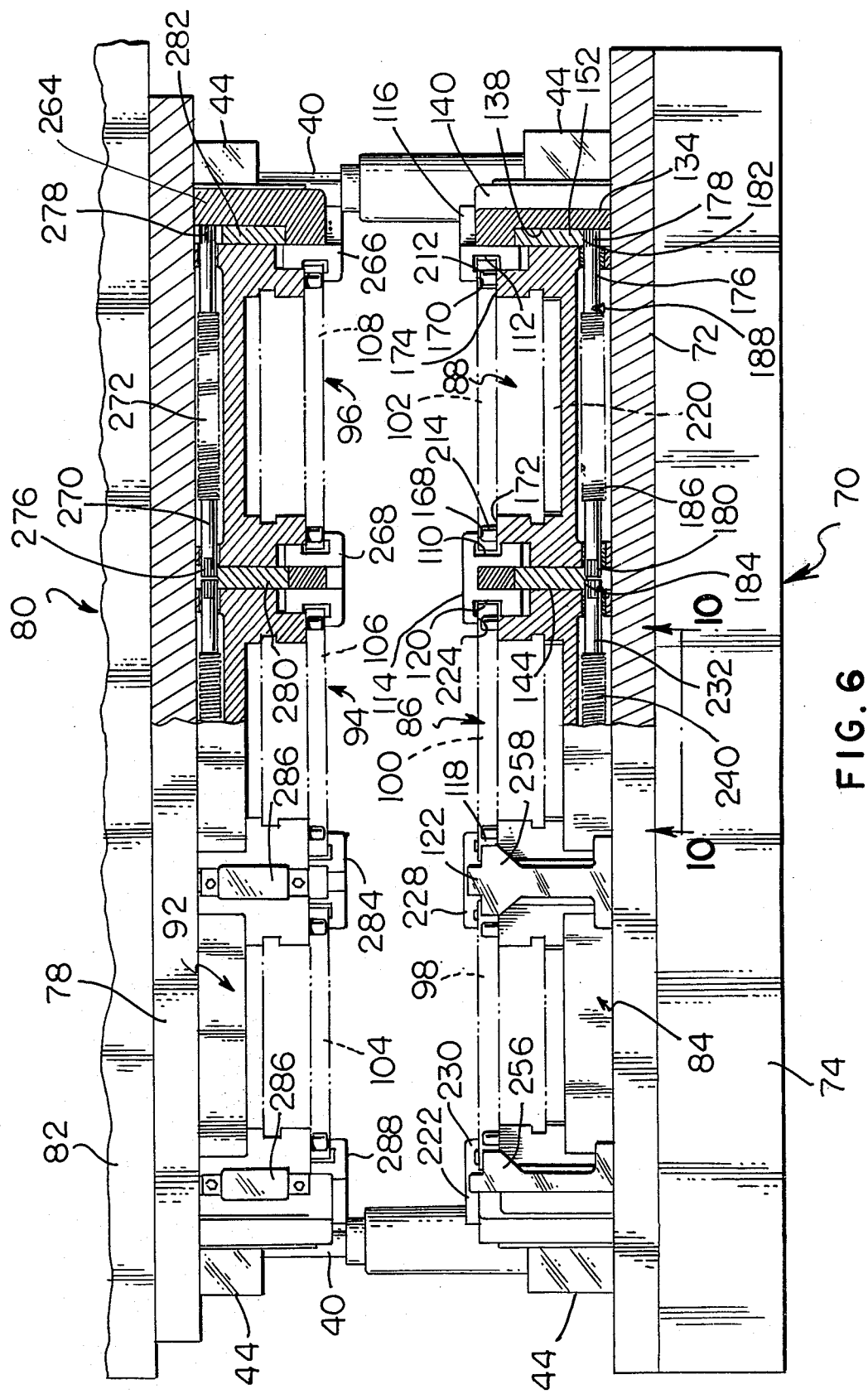

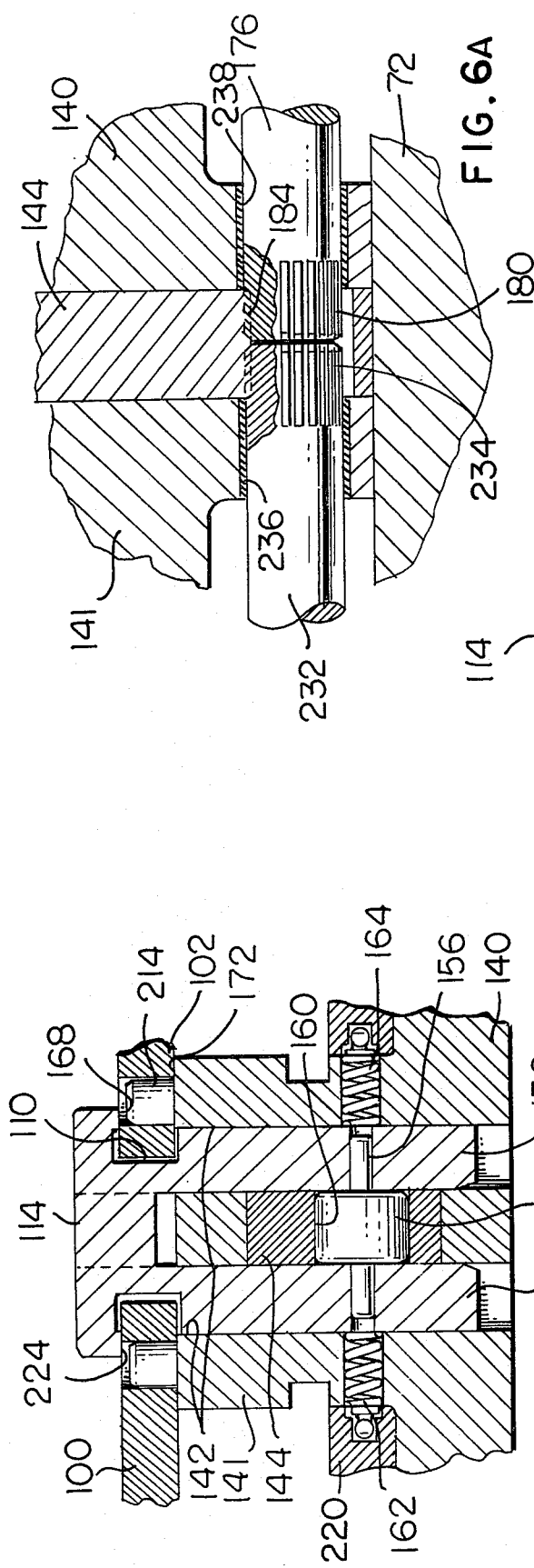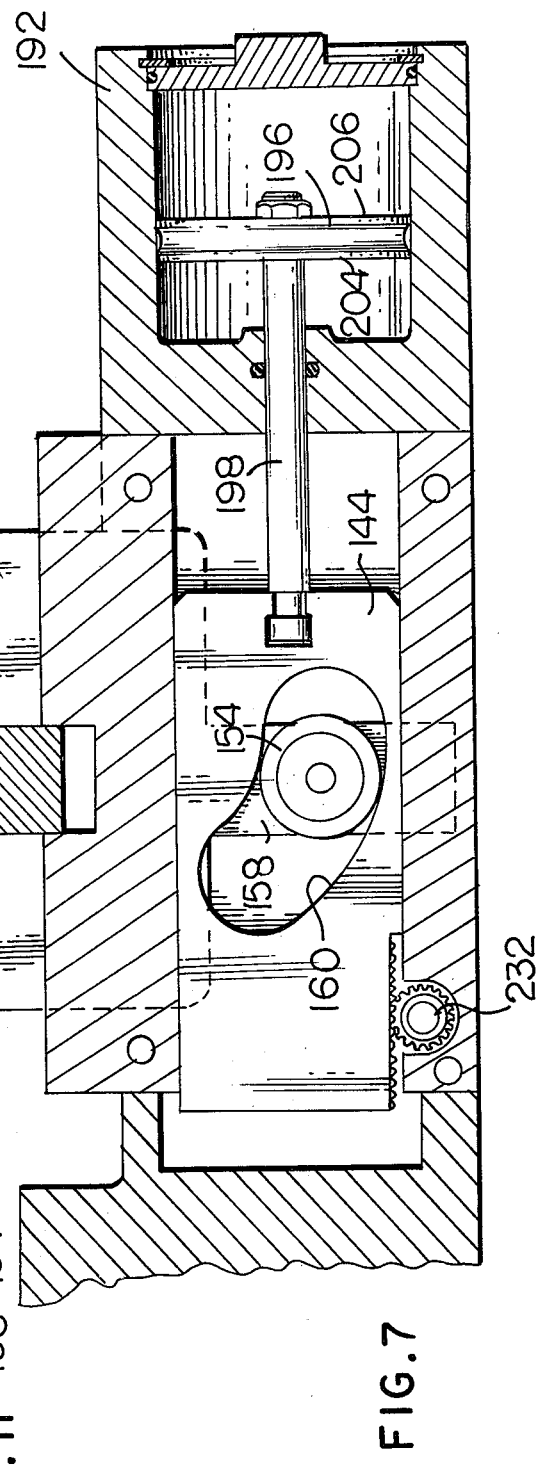

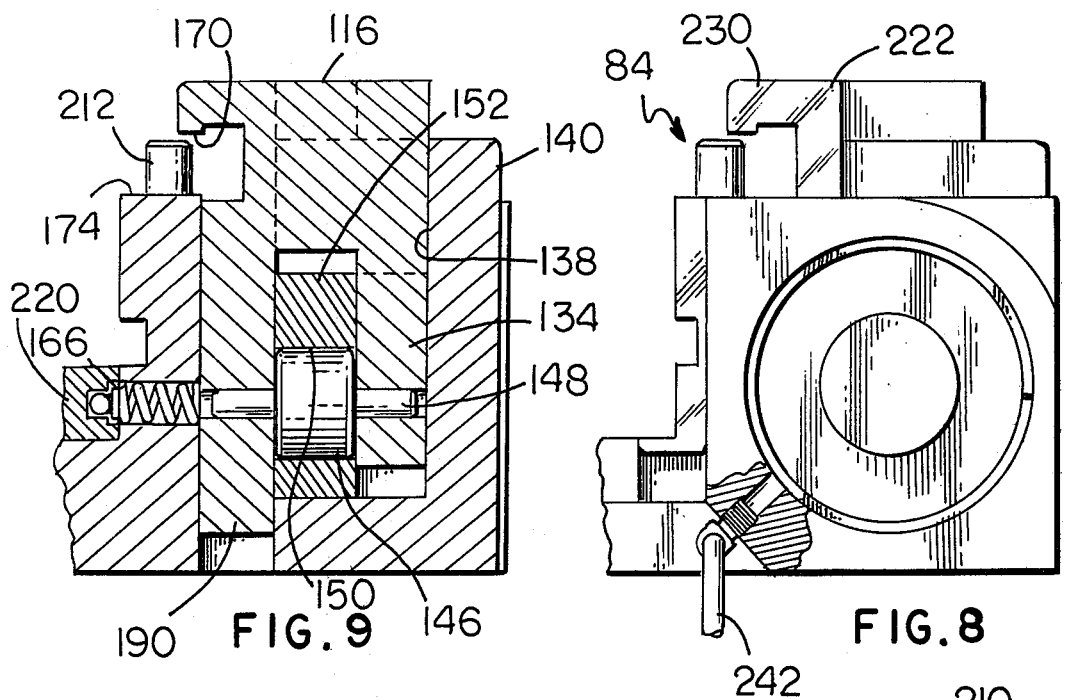
FIG. 9
FIG. 8
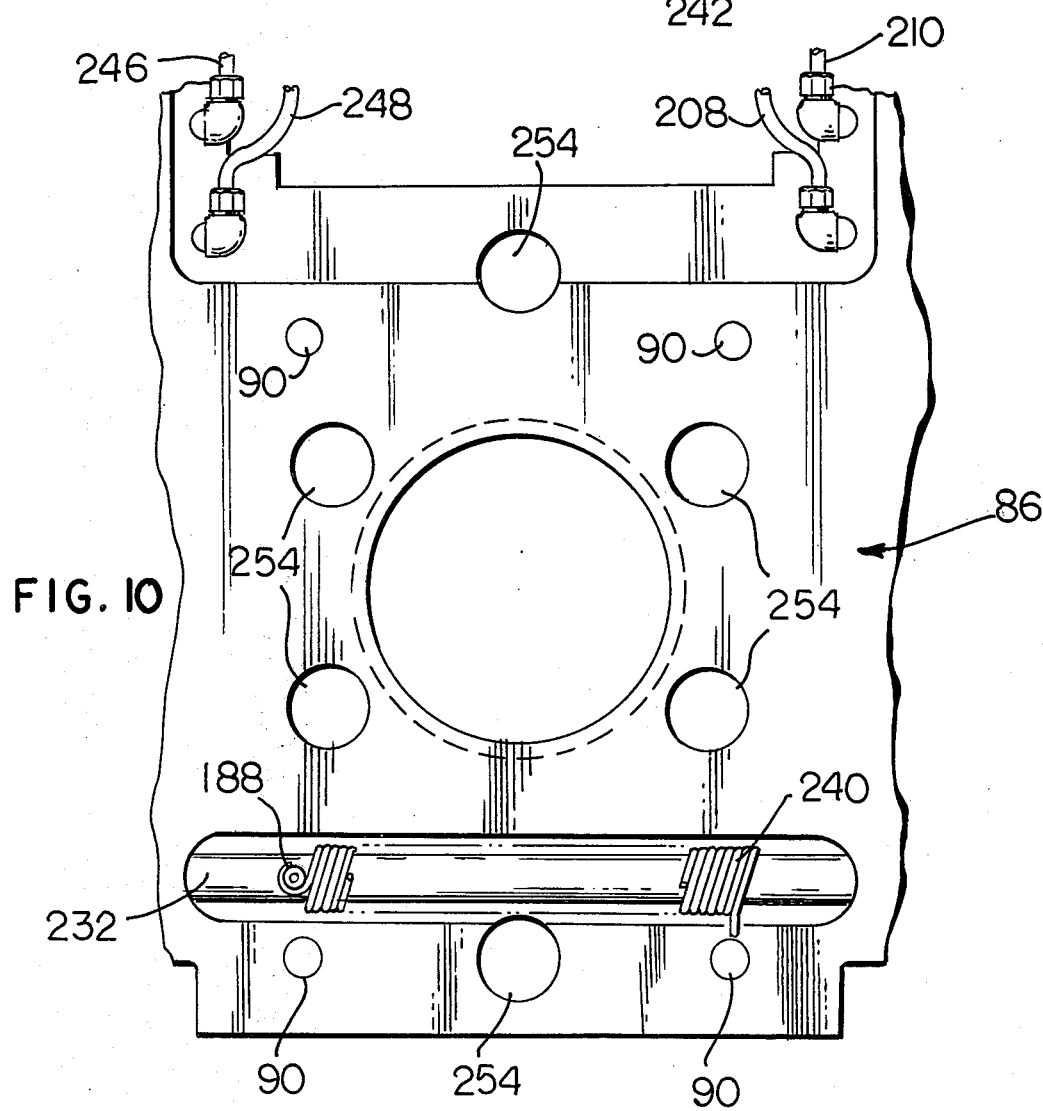
FIG. 10

TRANSFER PRESS HAVING QUICK CHANGE DIE SETS

BACKGROUND OF THE INVENTION

The invention relates to a stamping press and in particular to a transfer press having means for enabling the upper and lower dies to be changed quickly.

In producing parts by stamping, it is often necessary to perform a number of successive individual stamping operations in progressing from strip stock or blanks to the finished product. As an alternative to performing each stamping operation on a separate press or on the same press following a die change, press systems have been developed whereby a plurality of successive stamping operations can be performed in one pass through a single press.

One such system employs a die arrangement called a progressive die wherein the workpiece starts as a strip of stock and progressively assumes the desired final shape as it passes through the die stations in succession. In a progressive die, the workpiece remains attached to the edge portions of the strip so as to facilitate locating of the workpieces in the various die stations. Although accurate locating of the workpiece is simplified, the necessity that the workpiece be attached to the edge of the strip restricts the type of stamping operations which can be performed.

A press system which overcomes some of the drawbacks inherent in progressive die systems is the transfer press. In this machine, individual blanks or pre-formed parts are loaded into the press and then advanced successively from die station to die station by means of feed bars having part engaging fingers attached thereto. On the upstroke of the press, the bars and fingers move inwardly, grip the partially formed workpieces in each die station, lift if necessary, and advance them to the next stations for further forming on the downstroke of the press. The primary drawbacks to both the progressive die system and transfer press is, firstly, the extremely high cost of the die sets and, secondly, the considerable length of time required to change dies. In the case of a transfer die, for example, it often requires as long as one day to one day and a half to change the die sets which results in costly machine down time. For these reasons, progressive dies and transfer dies are economically feasible only for very large runs. In times of economic uncertainty, however, most part orders are relatively small, and the inordinately long press down time necessitated by die changing cannot be justified.

SUMMARY OF THE INVENTION

The transfer press according to the present invention overcomes the disadvantages and drawbacks of prior transfer presses by providing means whereby the individual dies in each station are capable of being quickly changed. Rather than removing the entire upper and lower die sets from the press, as is necessary with existing transfer presses, each die is unlocked and individually slid out of the press. The new dies are then inserted and automatically located as they are locked in place. Individual die fixtures of this type are disclosed in U.S. Pat. No. 3,327,575 owned by the assignee hereof. This patent is expressly incorporated by reference.

Specifically, the present invention contemplates a transfer die press having a bed, a slide, a plurality of generally linearly spaced die stations on the bed and slide, and transfer means for successively advancing work from one station to the next each cycle of the press wherein the improvement comprises quick change die fixture means at each of the stations for supporting and accurately locating pairs of cooperating die parts, the fixture means includes releasable clamp means for exerting clamping pressure on the die parts when activated, and when deactivated for releasing the die parts to be removed readily from the respective fixtures.

It is an object of the present invention to provide a transfer press wherein the dies are received in upper and lower quick change fixtures mounted to the press slide and bed or bolster, respectively, and wherein adjacent fixtures of each set are closely spaced from each other.

It is a further object of the present invention to provide a transfer press having quick change die sets wherein the facing edges of adjacent die fixtures are clamped by means of a single clamping mechanism so as to minimize fixture spacing.

A further object of the present invention is to provide a method of changing dies in a transfer press wherein the dies are individually removed from the press rather than removing the entire upper and lower die sets.

A still further object of the present invention is to provide a transfer press having quick change die fixtures wherein the respective sets of dies are clamped and unclamped together, utilizing common clamps on center fixtures and having equalizing shafts so that all clamps operate in unison.

Another object of the present invention is to provide a transfer press wherein sets of dies can be quickly changed so that short runs are economically feasible.

Yet another object of the present invention is to provide a transfer press wherein a change can be made from left hand parts to right hand parts or vice versa by removing only one die from the press and inserting another.

These and other objects of the present invention will be apparent from the detailed description taken together with the accompanying drawings.

BRIEF DESCRIPTION OF THE DRAWINGS

FIG. 2 is a perspective view of a lower fixture set according to the present invention;

FIG. 3 is a perspective view of an alternative roll feed for the transfer press shown in FIG. 1;

FIG. 4 is a perspective view of the press shown in FIG. 1 from which the transfer mechanism has been removed;

FIG. 6 is a partly sectioned elevational view of the upper and lower die fixtures mouned in the press;

FIG. 6a is an enlarged sectional view of the abutting ends of adjacent torsion rods;

FIG. 7 is a sectional view taken along line 7—7 of FIG. 5;

FIG. 8 is a partially sectioned view taken along line 8—8 of FIG. 5;

FIG. 9 is a sectional view taken along line 9—9 of FIG. 5;

FIG. 10 is a fragmentary plan view taken along line 10—10 of FIG. 6; and

FIG. 11 is a sectional view taken along line 11—11 of FIG. 5.

DETAILED DESCRIPTION

Figure 1:
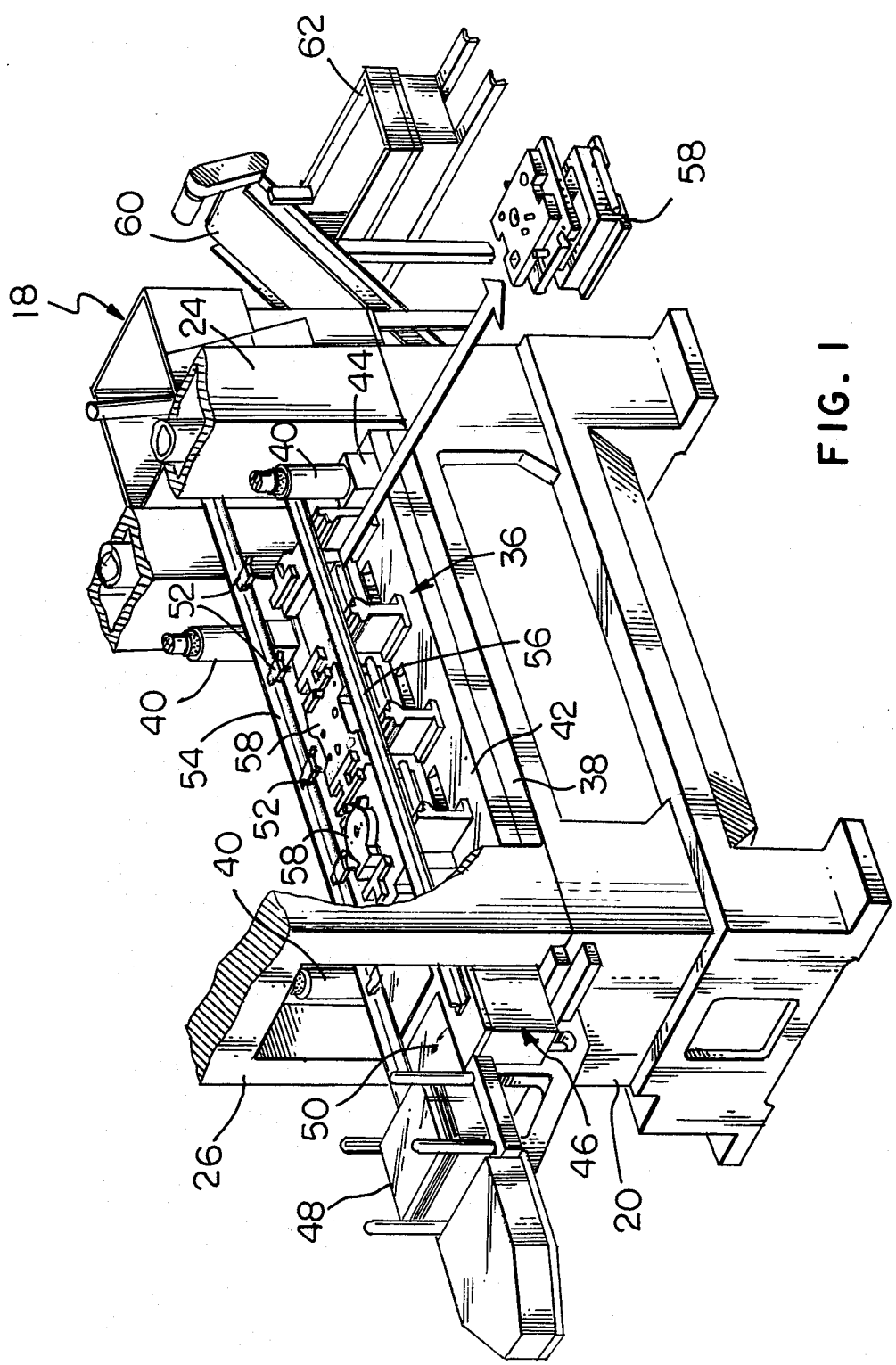
FIG. 1 is a perspective view of a portion of a transfer press incorporating the present invention.

Referring now to the drawings and especially FIGS. 1-4, the press 18 comprises a bed 20, a crown 22 and uprights 24 and 26 extending therebetween. Mounted on crown 22 is a drive motor 28 which drives a flywheel housed by cover 30. In a manner well known in the art, the flywheel, through a drive mechanism (not shown), causes press slide 32 to reciprocate vertically.

Secured to slide 32 is an upper die fixture indicated generally at 34 which coacts with lower die set indicated generally at 36, which is stationary and mounted on bolster 38 which in turn is secured to bed 20. Upper die set 34 is guided in its vertical reciprocal movement by means of four guide post assemblies 40 which are rigidly secured to the upper and lower mounting plates 42 by means of blocks 44.

The press according to the present invention is a transfer press and is therefore equipped with a transfer mechanism indicated generally at 46. This serves to feed blanks from blank stack 48 into the press 18 one at a time. As the individual blanks 50 are removed from stack 48, they are engaged by fingers 52 which are mounted on transfer bars 54 and 56. Each cycle of the press 18, bars 54 and 56 move inwardly to cause fingers 52 to engage the blank 50 or workpiece (not shown), lift the blank 50 or workpiece off the die 58 and advance it longitudinally to the next die 58 and lower it for subsequent forming. After the workpiece or blank is repositioned, bars 54 and 56 move outwardly so that fingers 52 disengage the blank 50 or workpiece and upper die set 34 moves downwardly to coact with lower die set 36 and form the blank 50 and workpieces positioned on the lower dies 58. The finished parts are carried off by conveyor 60 and deposited in parts bin 62. In the case of the press shown in FIG. 1, blanks 50 may constitute scrap from other stamping operations.

As an alternative to feeding blanks 50 into the press 18, the press can be supplied with a roll feed 66 for feeding stock 64 as shown in FIG. 3. The stock width can be matched to the size blank which is required then notched, parted and transferred through the press. By so matching the width of the stock 64 to the size blank needed, a savings over progressive dies is realized by eliminating the need for part-carrying scrap skeleton.

It should be noted that the transfer press according to the present invention may include as many die stations as desired within practical limits. The press illustrated in FIG. 1, for example has three die stations whereas the lower die set shown in FIG. 2 has five die stations. Each station generally comprises a die fixture 68 within which the die plates 59 are clamped. It should be noted that die plates 59 are provided with dies that are shaped according to the stamping which is to be accomplished, although this detail has been omitted in FIG. 2 for the sake of clarity.

Referring now to FIGS. 5 through 11, upper and lower die fixtures according to the present invention having three die stations shown will be described. The lower die fixtures 70 comprise a plate 72 which is rigidly secured to bolster 74 by means of bolts 76. Plate 78 of upper die set 80 is similarly bolted to slide 82. Lower die fixtures 84, 86 and 88 are securely fastened to plate 72 by bolts or screws 90 which are recessed within the floor of fixtures 84, 86 and 88. Upper die fixtures 92, 94 and 96 are similarly fastened to upper plate 78.

Die plates 98, 100, 102, 104, 106 and 108, each of which are adapted to have a shaping element (not shown) secured thereto, are slidably received within two ways or slots within the fixtures 84, 86, 88, 92, 94 and 96, respectively. Lower fixtures 84, 86 and 88 are nearly identical as are upper fixtures 92, 94 and 96, with respect to each other and to avoid needless redundancy, not all of them will be described in detail. The slots 110 and 112 in fixture 88 are adapted to slidably receive die plate 102 and are formed within mounting elements or clamps 114 and 116, respectively, which are in a raised position at the start of the die change operation in order to receive the die plate 102. Replacement and mounting of the die plate 102 is simply a matter of sliding the two opposite edges thereof within slots 110 and 112 of clamps 114 and 116. Die plate 100 in the adjacent fixture 86 is similarly received within slots 118 and 120 within mounting devices 122 and 114.

Die plate 102 is approximately aligned by sliding it rearwardly into fixture 88 until locating ears 126 and 128 abut the forward surfaces 130 and 132 on clamps 114 and 116, respectively.

Clamps 114 and 116 are movable rectilinearly in the vertical direction and are extended and retracted by slide sections 134-190 (FIGS. 6 and 9) and 136-158 (FIGS. 6 and 11). The vertical direction of retraction for the lower fixture 88 is in a downward direction and the direction of retraction for the corresponding upper fixture 96 is in the upward direction. Slide 134-190 fits into vertical slideway 138 in housing 140 and slide 136-158 fits in slideway 142 defined by housings 140 and 141 and cam slide rack 144.

A cam follower 146 (FIG. 9) is mounted on roller shaft 148 which is received within clamp slides 134 and 190. Follower 146 is received within kidney shaped cam slot 150 configured in cam slide rack 152 which is so shaped that when rack 152 is moved in the forward direction, clamp 116 is pulled downwardly by the operation of cam follower 146. Slot 150 is so shaped that it has an angle of approximately 12° in engagement with follower 146 when cam slide rack 152 is moved forwardly such that clamp 116 is fully retracted. Although this is not a true locking angle, it sufficiently approximates a locking angle to effect a position holding action on clamp 116 when the die plate 102 is clamped therein.

A similar cam follower 154 (FIG. 11) is rotatably mounted on roller shaft 156 which is received within slides 136 and 158 of clamp 114 which bridge follower 154. Cam slide rack 144 is provided with a cam slot 160 identically shaped to slot 150 and as slide rack 144 is urged forwardly, clamp 114 will be retracted in a downwardly direction. 162, 164 and 166 are spring loaded plungers which serves to retain wear plates It will be seen that die plate 102 is clamped between the downwardly facing overhanging surfaces 168 and 170 of clamps 114 and 116, respectively, and the upwardly facing surfaces 172 and 174 of housing 140.

Cam slide 158-136 and cam slide 134-190 are operatively linked by means of torsion rod 176 having pinions 178 and 180 at the ends thereof which mesh with teeth 182 and 184 in cam slide racks 152 and 144, respectively. This ensures that clamps 114 and 116 will move simultaneously thereby drawing the die plate 102 squarely downwardly and upwardly. In addition to preventing warping of die plate 102, this constrains it to rectilinear movement at each of its four corners, this being an important factor in the accurate locating of the plate 102 within the fixture 88.

Torsion rod 176 includes a torsion spring 186 which is anchored to rod 176 at one end by means of screw 188 and has a free end which engages fixture 88 such that when the clamps 114 and 116 are being retracted by movement of slides 158-136 and 190-134, shaft 176 is rotated in a direction such that spring 186 is uncoiled. There are a number of revolutions of pretensioning of spring 186 so that resilient force is always exerted thereby tending to pull clamps 114 and 116 downwardly against die plate 102. Thus, when clamps 114 and 116 are fully retracted, there remains several revolutions of pretensioning which is sufficient to urge slides 158-136 and 190-134 downwardly. This acts through cam slots 150 and 160 thereby holding followers 146 and 154 and clamps 114 and 116 in a fully retracted position. This is a safety feature which prevents die plate 102 from being released should pneumatic pressure be lost.

Figure 5:
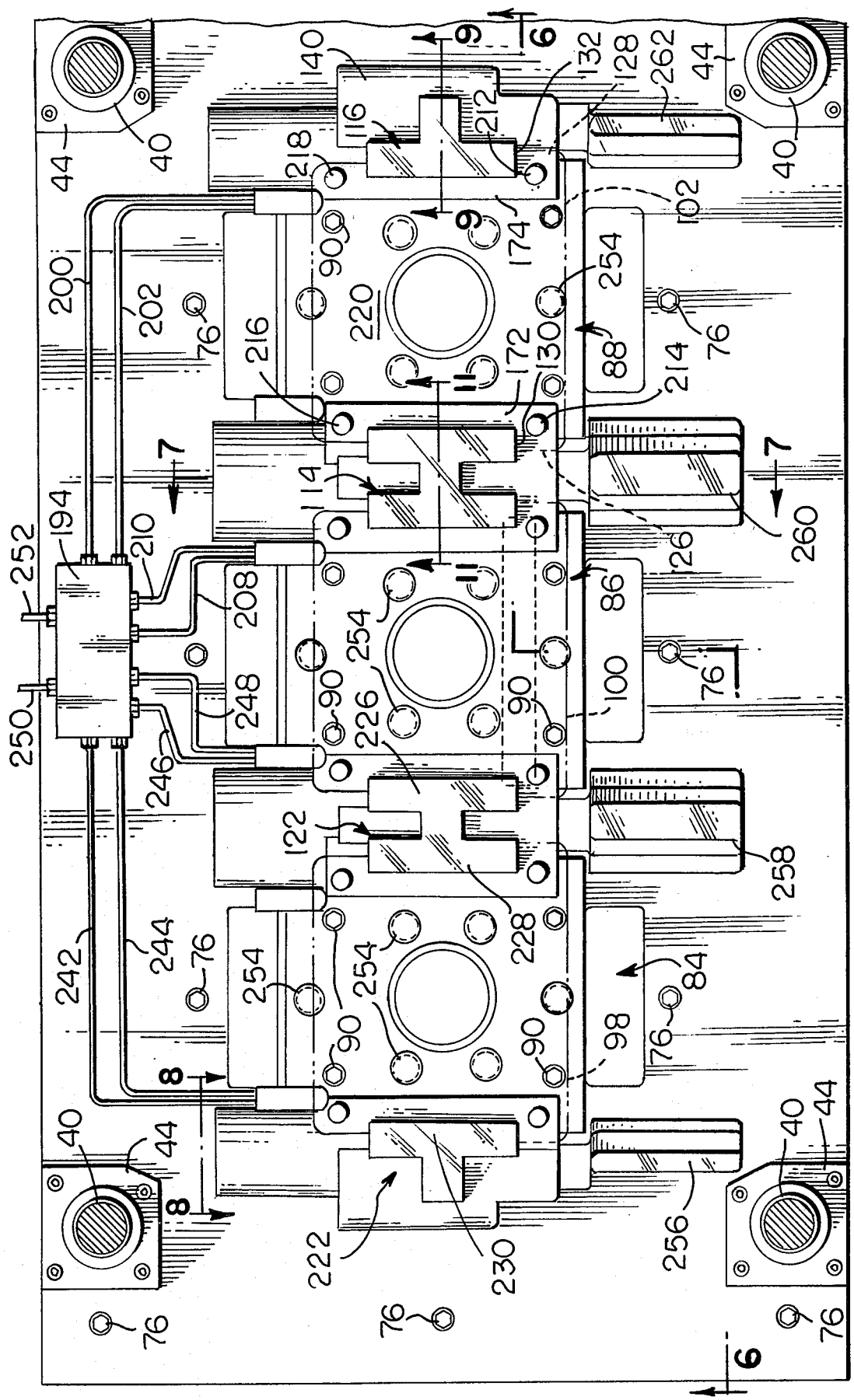
FIG. 5 is a plan view of the lower die fixture.

With particular reference to FIGS. 5 and 7, an air cylinder 192 connected to air manifold 194 has a piston 196 reciprocably received therein and connected with cam slide rack 144 by means of connecting rod 198. Cylinder 192 is selectively supplied with pneumatic pressure through lines 208 or 210, which acts against faces 204 or 206 of double acting piston 196 to extend and retract, respectively, clamp 114. Clamp 116 is provided with a similar piston and cylinder arrangement (not shown) and is supplied with pneumatic pressure through lines 200 and 202.

Die plate 102 is accurately located within fixture 88 by means of four locating pins 212, 214, 216 and 218, which are fixedly connected to fixture 88. Pins 212, 214, 216 and 218 have tapered upper ends. Die plate 102 is approximately located by abutting locating ears 126 and 128 against surfaces 130 and 132 so that the openings in die plate 102 are approximately aligned with pins 212, 214, 216 and 218. As clamps 114 and 116 retract die plate 102, the approximate alignment previously attained ensures that there will be at least partial entry of pins 212, 214, 216 and 218 within the openings so that further downward travel will cause plate 102 to adjust its positions such that the pins 212, 214, 216 and 218 will fully enter the opening thereby causing proper location of the plate 102 and its die.

If desired, fixture 88 may be provided with a wear plate 220 and a plurality of support blocks (not shown). Alternatively, a back-up block may be inserted in fixture 88. The general structure of fixture 88 and the other fixtures 84, 86, 92, 94 and 96 and the means for effecting locating and clamping are described in greater detail in the aforementioned U.S. Pat. No. 3,327,575.

Clamp mechanism 122 associated with die plates 98 and 100 is identical to clamp mechanism 114 and end clamp mechanism 222 is essentially identical to clamp mechanism 116, except that it is the mirror image thereof. As can be seen, die plate 98 is clamped by means of clamp mechanisms 222 and 122, plate 100 is clamped by mechanisms 122 and 114 and plate 102 is clamped by mechanism 114 and 116. Clamp 114 includes a second downwardly facing overhanging surface 224 which clamps one side of plate 100 against fixture 86. The overhanging portion 226 of clamp 122 clamps the other side of plate 100 and its opposite integral overhanging portion 228 clamps one side of plate 98. Clamp 222 includes a similarly structured overhanging portion 230 which clamps the side of plate 98 opposite that clamped by overhanging portion 228.

Clamps 116, 114, 122 and 222 are operatively mechanically linked by means of torsion rods 176, 232 and an identical rod (not shown) received within fixture 84.

With reference to FIG. 6A, it will be seen that adjacent rods, such as rods 176 and 232 abut each other and are provided with pinions 180 and 234 which mesh with the teeth on the respective cam slide rack 144 located therebetween. Rods 176 and 232 are rotatably received within bushings 236 and 238. Each of the rods 176 and 232 as well as the torsion rod received within fixture 84 are provided with springs 186 and 240 to cause the torsion rods to function in the manner described above.

Pneumatic pressure for clamping mechanism 222 is provided alternatively through lines 242 and 244 and pneumatic pressure for clamping mechanism 122 is supplied alternatively through lines 246 and 248. By controlling the pneumatic pressure through supply lines 250 and 252, simultaneous actuation of clamping mechanisms 222, 122, 114 and 116 is further assured.

Referring to FIG. 5, each of the fixtures 84, 86 and 88 are provided with cushion pressure pins 254. Support brackets 256, 258, 260 and 262, secured to plate 72 in alignment with the bottom of the slots, such as slots 112 and 110, of clamp mechanisms 222, 122, 114 and 116 in their extended positions, enable die plates 98, 100 and 102 to be pulled out of the press to an easily accessible location before they must be physically supported by the machine operator.

The upper fixtures 92, 94 and 96 are essentially identical to each other and nearly identical to lower fixtures 84, 86 and 88. Upper fixture 96, for example, includes a main housing member 264, which is bolted to upper plate 78, and slidably houses a pair of clamps 266 and 268 similar to corresponding lower clamps 114 and 116. A torsion rod 270 is rotatably received within housing member 264 and includes a coil spring 272 which is pretensioned to rotate rod 270 in a direction causing clamps 268 and 266 to be retracted. A pair of piston and cylinder arrangements (not shown) similar to those described in connection with the corresponding fixture 88, extend and retract clamps 266 and 268 by means of a camming arrangement similar to that described above. As will be seen, pinions 276 and 278 on the ends of torsion bar 270 engage the cam slide racks 280 and 282 associated with clamps 268 and 266, respectively.

Fixture 92 is identical to fixture 96 except that it is the mirror image converse thereof. Fixture 94 is similarly constructed except that die plate 106 is clamped between double clamps 268 and 284. Slide covers 286 protect the sliding surfaces of clamps 288, 284, 268 and 266 from chips and other debris. If desired, upper fixtures 92, 94 and 96 could be provided with brackets similar to lower brackets 256, 258, 260 and 262.

In operation, upper and lower clamps 288, 284, 268, 266, 222, 122, 114 and 116 are opened by applying pneumatic pressure to the appropriate lines for the insertion of die plates 98, 100, 102, 104, 106 and 108, which have dies (not shown) mounted thereto suitable for performing the desired successive stamping operations. In the case of lower die set 70, pneumatic pressure is admitted to line 252, for example, thereby retracting piston 196 and the pistons associated with clamps 116, 114, 122 and 222. The application of pneumatic pressure to the appropriate line of the upper air manifold, which is similar to lower manifold 194 and has a plurality of lines extending therefrom and connecting with piston and cylinder arrangements which are identical to piston 196 and cylinder 192, causes the clamps 288, 284, 268 and 266 in upper die set 80 to open. Although the operation of lower fixture 88 only will be described in detail, it should be noted that the sequence of events applies to the other fixtures 86, 84, 92, 94 and 96.

As piston 196 is retracted, connecting rod 198 pulls cam slide rack 152 rearwardly. The operating surface of cam slot 150 acts against follower 146 and pushes it upward so that slide 190-134 is raised and with it clamp 116. The rearward motion of cam slide rack 152 rotates torsion bar 176 thereby further tensioning spring 186. The application of pneumatic pressure to the piston and cylinder associated with the next clamp 114 similarly pulls cam slide rack 144 rearwardly and raises follower 154 and cam slide 158-136 and therefore clamp 114. By virtue of the gearing between cam slide racks 144 and 152 and torsion bar 176, simultaneous actuation of clamps 114 and 116 is ensured. By the camming action just described associated with each of the fixtures 84, 86, 88, 92, 94 and 96, clamps 222, 122, 114, 116, 288, 284, 268 and 266 are extended.

At this point, die plates 98, 100, 102, 104, 106 and 108 and their associated dies are slid within their respective clamps until the locating ears, such as ears 126 and 128 abut the respective stop surfaces 130 and 132. This positions the openings within the die plates 98-108 over the respective locating pins 212, 214, 216 and 218.

Pneumatic pressure is then applied to the other line 250 in the case of lower manifold 194 and to the corresponding line of the upper manifold. In exemplary fixture 88, this causes piston 196, connecting rod 148 and cam slide rack 152 to be driven forward thereby pulling follower 146, slide 190-134 and clamp 116 downwardly. This pulls die plate 102 over locating pins 212, 214, 216 and 218 so as to accurately locate it within fixture 88. Thus, die plate 102 is clamped between the downwardly facing surfaces 168 and 170 of clamps 114 and 116, respectively, and the upwardly facing surfaces 172 and 174 of fixture housing 140. Similar action with respect to fixtures 84, 86, 92, 94 and 96 locates and clamps die plates 98, 100, 104, 106 and 108, respectively. With the dies positioned and locked in place, blanks or workpieces are transferred through the press successively to the die station defined by fixtures 84 and 92, to the next die station defined by fixtures 86 and 94, to the third die station defined by fixtures 88 and 96 and from there to suitable conveyor means or the like for carrying the stamping off. The transfer function is performed by the transfer mechanism 46 described earlier. Once each of the die stations is filled with a blank or workpiece, the three stamping operations are performed simultaneously on each downward stroke of the press. Of course, more than three stamping operations could be performed by lengthening the bed of the press and adding additional stations.

To change dies, the press 18 is stopped, transfer bars 54 and 56 are either removed or pulled out of place or the finger bars releasably connected thereto are removed or pulled out of place, and the upper and lower clamps 288, 284, 268, 266, 222, 122, 144 and 116 are opened. This is accomplished in the manner previously described wherein the actuation of respective pneumatic pistons causes clamps 288, 284, 268, 266, 222, 122, 114 and 116 to be extended. Upper die plates 104, 106 and 108 and lower plates 98, 100 and 102 are pulled forwardly, lower die plates 98, 100 and 102 being supported by brackets 256, 258, 260 and 262, and lifted out of the press 18. New dies and die plates are then inserted as previously described and clamps 288, 284, 268, 266, 222, 122, 114 and 116 are locked. After performing the necessary adjustments, the stamping operation can be resumed.

An important feature of the transfer press according to the present invention is its ability to form right hand and left hand part configurations in subsequent operations with very little machine down time. To run the right hand configuration, for example, the upper die for the left hand part is omitted so that no forming is occurring at that die station. The right hand stamping station, on the other hand, includes both the upper and lower dies so that a completed right hand part will be produced by the transfer stamping operation. When it is desired to run the left hand parts, the press is stopped, the upper die set is unlocked, the appropriate left hand die is inserted in the half empty station and the upper die for the right hand stamping station is removed. The upper die set is then relocked and operation is resumed. Since the right hand station now no longer contains an upper die, no forming will take place at this station. In the stamping operation peculiar to the left hand part, however, both die halves are present and left hand parts will be produced by the transfer operation.

It is intended that the die fixtures be mounted on four post master sets thereby enabling the use of conventional presses. If desired, integrally mounted air cylinders can be utilized in combination with the upper fixtures for ejecting parts therefrom. Additionally, air cushions can be used in combination with the lower fixtures. The use of color coding for the die stations enables the operator to easily identify the proper die plates for each station.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the limits of the appended claims.

We claim:

1. In a transfer press having a bed, a slide, a plurality of generally linearly spaced die stations on said bed and slide the improvement comprising: said die stations including an upper and lower quick change die fixture means for supporting and accurately locating matched pairs of cooperating die parts mounted on interchangeable die plates, said fixture means including releasable clamp means for exerting clamping pressure on the die plates when activated, and when deactivated for releasing said die plates so that the upper and lower die plates can be readily removed from said respective die fixtures, and transfer means for advancing the work pieces through the transfer press successively from one said die station to the next each cycle of the transfer press.

2. The transfer press of claim 1 wherein said clamp means comprises a plurality of extendible and retractable clamps positioned respectively between adjacent set fixtures and engageable with the die parts and respective adjacent fixtures to clamp the die parts therein.

3. The press of claim 2 wherein said clamping means includes means for simultaneously retracting at least some of said clamps into engagement with the respective die parts.

4. The press of claim 1 wherein said clamp means comprises a plurality of pairs of adjacent extendible and retractable clamps positioned respectively on adjacent said fixtures and engageable with the die parts and the respective fixtures to clamp the die parts therein, said clamps including means whereby the respective die parts engageable thereby are clamped simultaneously when the respective clamps are activated.

5. The press of claim 1 wherein said clamp means comprises a plurality of pairs of interconnected adjacent extendible and retractable clamps positioned respectively between adjacent said fixtures and engageable with the die parts in the respective fixtures to clamp the die parts therein, said pairs of clamps including means whereby the respective die parts engageable thereby are clamped simultaneously when the respective pair of clamps is activated.

6. The press of claim 5 wherein the clamps of each pair are rigidly joined and include camming means for effecting simultaneous clamping of the die parts of the respective adjacent fixtures.

7. The press of claim 5 including rotatable shaft means interconnecting a plurality of pairs of said clamps for causing simultaneous retracting and extending thereof and for resiliently biasing said last mentioned plurality of pairs of said clamps in a retractive direction which effects clamping of the respective die parts engaged thereby.

8. A transfer die press comprising:
a bed,
a slide,
a plurality of generally linearly spaced upper and lower quick change die fixtures forming a tooling unit, each fixture comprising a pair of extendable and retractable mounting means having means for removably receiving and aligning a die therein, means for simultaneously retracting said mounting means and clamping the die in a final operative position, said fixtures being mounted on said slide and said bed and arranged in a generally linearly spaced apart fashion, said dies being capable of being readily slid out of their respective fixtures without the necessity of removing the fixtures from the slide and bed, and
transfer means for advancing work through the press successively from one said fixture to the next each cycle of the press.

9. The press of claim 8 including means for simultaneously retracting the mounting means for all of said fixtures.

10. The press of claim 9 wherein said means for retracting includes torsion bar means interconnecting said mounting means and resiliently biasing said mounting means in a retractive direction which effects clamping of the dies in their final operative positions.

11. The press of claim 10 wherein adjacent fixtures include respective mounting means which are adjacent and rigidly connected to each other.

12. The press of claim 11 wherein said means for retracting includes a plurality of motor actuated camming means associated with respective said connected mounting means for retracting the same.

13. The press of claim 8 wherein:
said fixtures are arranged in a row having two end fixtures and at least one center fixture,
said mounting means comprises a motor actuated clamp means on each end of said row for clamping the respective dies in said end fixtures and a single motor actuated clamp means between each pair of adjacent fixtures in the row for clamping the dies in the respective adjacent fixtures.

14. The press of claim 13 including means for interconnecting said motor actuated clamp means to retract and extend simultaneously.

15. The press of claim 14 wherein said means for interconnecting comprises a plurality of torsion rods in end to end relationship geared respectively to the motor driven clamp means on said fixtures.

16. In a transfer press having a bed, a slide, a plurality of generally linearly spaced die stations on said bed and slide, and transfer means for successively advancing work pieces from one station to the next each cycle of the press, the improvement comprising:
a pair of quick change die fixtures forming a tooling unit mounted respectively on said die bed and slide at each of said stations including means for supporting and accurately locating matched pairs of cooperating upper and lower die parts mounted on interchangeable die plates,
each said fixture including upper and lower pairs of spaced apart simultaneously actuatable clamp means for releasably clamping the die plates in respective said fixtures,
said fixtures including means whereby the die parts mounted on said plates supported therein may be freely removed when unclamped.

17. The press of claim 16 wherein said upper fixtures and said lower fixtures respectively are arranged in linear rows and include means whereby adjacent die parts are closely spaced from each other.

18. In a transfer press having a plurality of die stations each including an upper and lower die fixture forming a tooling unit for receiving and aligning die parts therein and transfer means for successively advancing work from one station to the next each cycle of the press, a method for quick changing dies comprising the steps of:
unclamping the die parts for the respective fixtures with the fixtures till in the press,
individually removing the unclamped die parts from the respective fixtures within the press,
inserting selected die parts into the fixtures from which the previous die parts have been removed, and
accurately aligning and clamping the selected die parts in their respective fixtures.

19. The method of claim 18 wherein the die parts are accurately located during clamping thereof.

20. The method of claim 18 wherein the die parts are automatically accurately located after they are inserted into the fixtures.

21. The method of claim 20 wherein the die parts are approximately located during insertion into the fixtures by means of abutting surfaces on the die parts and fixture respectively.

22. The method of claim 18 wherein the die parts are slidably inserted into and removed from the fixtures.

23. The method of claim 18 wherein locating elements are caused to come into engagement with the die parts after the die parts are inserted in the fixtures.

24. The method of claim 23 wherein the locating elements engage the die parts during clamping thereof.

25. In a transfer die press having a bed, a slide, a plurality of upper die fixtures secured to the slide and having upper die parts clamped respectively in selected ones of said fixtures, a plurality of lower die fixtures secured to the bed and having lower die parts clamped respectively in selected ones of said lower die fixtures, the upper die parts operating with the respective lower die parts so as to form a plurality of used die stations and at least one unused die station, said upper and lower fixtures forming a tooling unit and transfer means for advancing work through the press successively from one die station to the next each cycle of the press, a method for quick changing of dies comprising the steps of:

unclamping one of the die parts from its fixture in one of the used stations with the fixture still in the press, removing the unclamped die part in said one used station, inserting at least one selected die part in the respective fixture of said unused station, and accurately aligning the selected die part and clamping the selected die part in its fixture.

* * * * *

UNITED STATES PATENT AND TRADEMARK OFFICE
CERTIFICATE OF CORRECTION

PATENT NO. : 4,160,372
DATED : July 10, 1979
INVENTOR(S) : Roland J. Bergman, Richard J. Meyer, and Richard F. Fortman It is certified that error appears in the above-identified patent and that said Letters Patent are hereby corrected as shown below:

Col. 2, line 54, "mouned" should be -- mounted --

Col. 4, line 51, after "plates" insert -- 220 --.

Col. 7, line 29, change "148" to -- 198 --.

Col. 7, line 58, change "144" to -- 114 --.

Claim 16, Col. 10, line 14, before "bed" delete -- die --.

Claim 18, Col. 10, line 37, change "till" to -- still --.

Signed and Sealed this

Sixteenth Day of October 1979

[SEAL]

Attest:

RUTH C. MASON
Attesting Officer

LUTRELLE F. PARKER
Acting Commissioner of Patents and Trademarks